United States Patent

Tabarelli et al.

[11] Patent Number: 5,329,356
[45] Date of Patent: Jul. 12, 1994

[54] INTERFEROMETER HEAD AND INTERFEROMETER ARRANGEMENT WITH RIGID SUPPORT STRUCTURE

[75] Inventors: Werner Tabarelli, Landstrasse 152, FL-9494 Schaan/Liechtenstein, Austria; René Lazecki, Buchs, Switzerland

[73] Assignee: Werner Tabarelli, Schaan Liechtenstein, Austria

[21] Appl. No.: 861,825
[22] PCT Filed: Oct. 18, 1990
[86] PCT No.: PCT/AT90/00102
§ 371 Date: Aug. 11, 1992
§ 102(e) Date: Aug. 11, 1992
[87] PCT Pub. No.: WO91/09271
PCT Pub. Date: Jun. 27, 1991

[30] Foreign Application Priority Data
Dec. 13, 1989 [AT] Austria ............... A 2829/89

[51] Int. Cl.[5] .................................... G01B 11/02
[52] U.S. Cl. ...................... 356/358; 356/356; 356/357
[58] Field of Search .................. 356/358, 357, 356

[56] References Cited
U.S. PATENT DOCUMENTS
4,120,588 10/1978 Chaum .................. 356/356

FOREIGN PATENT DOCUMENTS
0200360 2/1989 Japan .
WO8500221 1/1985 World Int. Prop. O. .

Primary Examiner—Samuel A. Turner
Assistant Examiner—LaCharles Keesee
Attorney, Agent, or Firm—Lorusso & Loud

[57] ABSTRACT

The invention relates to an interferometer head with a rigid bearer or casing to which a beam divider for the spatial division of laser light into a measuring and a reference beam and at least one recombination device are firmly secured (adhesively), where a reference beam guided by a reference path in the interferometer head and a measuring beam or part thereof guided by a movable measuring mirror of reflective measuring surface interfere to form at least one optical interference signal. To facilitate precise measurement of long shift paths or distances and obtain increased insensitivity to external and especially mechanical interference, according to the invention the interferometer head has a decoupling lens secured to the bearer of the interferometer head to decouple the measuring beam guided in a light waveguide in the interferometer head to a measuring path lying outside the interferometer head, and in addition the interferometer head has at least one coupling lens secured to the bearer to couple the measuring beam or section thereof returning after reflection from a measuring mirror fitted outside the interferometer head or from a reflective surface of the measuring path into a light waveguide. Moreover, to guide the reference beam(s) and the part of the measuring beam travelling in the interferometer head, there are light waveguides which are rigidly connected to the bearer of the interferometer head and are preferably cast with it.

46 Claims, 6 Drawing Sheets

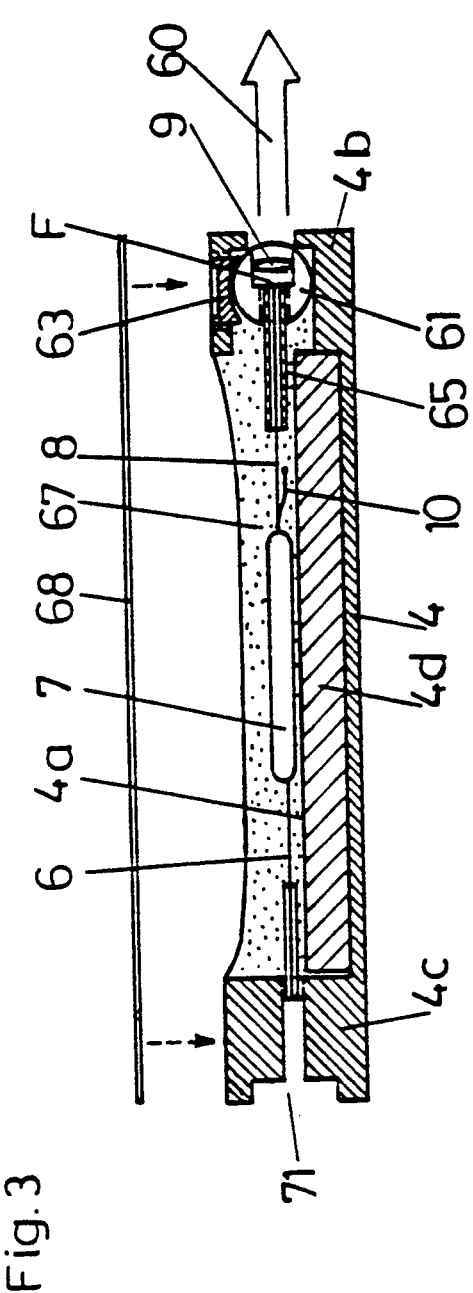

INTERFEROMETER HEAD AND INTERFEROMETER ARRANGEMENT WITH RIGID SUPPORT STRUCTURE

The invention relates to an interferometer head comprising a rigid support body to which there are rigidly connected a beam splitter for spatially dividing laser light into a measuring beam and a reference beam and at least one recombination device at which a respective reference beam which is guided byway of a reference section extending in the interferometer head and a respective measuring beam or measuring beam component which is guided by way of a movable measuring mirror or a reflecting measuring surface interfere, forming at least one optical interference signal.

Interferometer arrangements are already known, in which laser light is passed by way of flexible optical fibers to an interferometer head which is provided with a housing in which the essential optical components of the interferometer are disposed. Those optical components include in particular a beam splitter which divides the laser light originating from the light source which is disposed outside the interferometer head into a measuring beam and a reference beam. While the reference beam passes through a fixed reference section, the measuring beam is guided by way of a movable measuring mirror. At a recombination device which can structurally coincide with the beam splitter, the measuring and reference beams are superimposed and in that way form an optical interference signal. That interference signal or a plurality of such interference signals are passed by way of flexible optical fibers to a photoelectric detector device which is arranged outside the interferometer head and which detects and evaluates those optical interference signals from the interferometer head. An interferometer arrangement of that kind is known for example from U.S. Pat. No. 4,153,370. In the known apparatus the light issues from the light feed optical fiber into the closed interior of the interferometer head from which it impinges on to a beam splitter cube of discrete construction. The measuring mirror which is fixed to a sensing pin is arranged in the interior of the interferometer housing. Both the reference section through which the reference beam passes and also the measuring section through which the measuring beam passes lie within the interferometer head and pass through the gaseous medium which is present in the interferometer head and by way of the pressure of which the sensing pin together with measuring mirror can be moved in and out. That arrangement first of all suffers from the disadvantage that the fluctuations in pressure which are intentionally caused in the interior of the interferometer head also alter the refractive index and thus the relevant wavelength on the measuring section. Considerable measurement errors occur with the variation in that wavelength which occurs in the gas medium and in the units of which the interferometric measuring result in fact occurs. In addition, the displacement travel of the measuring mirror which is arranged within the interferometer housing is limited in practice so that only short displacement travels or distances can be measured. Finally, due to the non-collimated light guidance within the interferometer head housing, detection problems arise as the level of light output or power which is coupled into the necessarily thin output optical fibers is very slight. Conversely, when using thicker output optical fibers, it would not be possible accurately to detect the transverse spatial interference pattern.

The object of the present invention is to provide an interferometer head of the general kind set forth in the opening part of this specification, for an interferometer arrangement which is suitable in particular for determining distance or displacement travel, wherein laser light passes into the interferometer head from a laser light source which is disposed outside the interferometer head, wherein a photoelectric detector device is disposed outside the interferometer head, for detecting and evaluating at least one optical interference signal from the interferometer head, and with which it is also possible precisely to detect large distances or displacement travels (in the meter range and above), while the interferometer head is also to be insensitive in particular in relation to mechanical influences.

In accordance with the invention, that is achieved by an interferometer arrangement comprising an interferometer head which has a rigid support body to which there are rigidly connected a beam splitter for spatially dividing laser light into a measuring beam and a reference beam and at least one recombination device at which a respective reference beam which is guided by way of a reference section extending in the interferometer head and a respective measuring beam which is guided by way of a movable measuring mirror or a reflecting measuring surface interfere, forming at least one optical interference signal, wherein the interferometer head has a coupling-out or feed-out lens which is connected to the support body of the interferometer head, for coupling-out of the measuring beam guided in the interferometer head in at least one light waveguide on to a measuring section which is disposed outside the interferometer head, and the interferometer head further has at least one coupling-in or feed-in lens connected to the support body for coupling-in of the measuring beam which is returning from the measuring section after reflection at a measuring mirror arranged outside the interferometer head or at a reflecting surface into a respective light waveguide, and wherein light waveguides are provided for guidance of a reference beam or beams and the parts of the measuring beam which extend in the interferometer head, which light waveguides are rigidly connected to the support body of the interferometer head;

a laser light source which is arranged outside the interferometer head and whose laser light is fed to the interferometer head;

a photoelectric detector device arranged outside the interferometer head for detecting and evaluating at least one optical interference signal from the interferometer head, wherein at least one respective flexible optical fiber is provided for the feed of laser light from the laser light source to the interferometer head and possibly for the transmission of the optical interference signals from the interferometer head to the photoelectric detector device, the flexible optical fiber for the laser light feed being a monomode optical fiber, and wherein the flexible optical fiber or fibers at the interferometer head end can each be releasably connected by way of a releasable fiber connector to a respective light waveguide of the interferometer head.

In the interferometer head according to the invention, the measuring mirror and thus a great part of the measuring section lies outside the interferometer head. As a result, even long distances or displacement travels can be precisely ascertained by means of a compact interferometer head which is easy to handle. The spatial separation of the interferometer head from the light source and the photoelectric evaluation circuit firstly provides the known advantage of thermal decoupling, while the interferometer head itself does not need to contain any active photoelectric or electro-optical components. In addition the interferometer head according to the invention does not need to contain any mechanically moved parts, so that, once relative adjustment of the optical components in the interferometer head has been established, that setting is reliably maintained, even when tinkering with the interferometer head. With the interferometer head according to the invention, adjustment from the point of view of the user is essentially reduced to so arranging the interferometer head and the measuring mirror or the like that the measuring beam passed from the interferometer head on to the measuring section passes by way of the coupling-in lens or lenses into the interferometer head (or light waveguides disposed therein) again. That can be easily achieved in particular when using a retroreflector which is substantially invariant in relation to tilting phenomena (triple mirror).

Guiding light in light waveguides and coupling-out of the measuring beam on to a free measuring section are admittedly known per se (for example German laid-open application (DE-OS) No 32 38 139). In that respect however hitherto too little account was taken of the fact that, when guiding the reference beam or beams and parts of the measuring beam in light waveguides (for example optically integrated waveguide paths or flexible optical fibers), mechanical influences acting on those light waveguides result in a change in the interference signal. In the case of flexible optical fibers, for example just a slight change in position is sufficient to produce an undesirable change in the interference signal. While the property of light waveguides, in particular flexible optical fibers, to react to external influences (pressure, temperature but also simple changes in position) is frequently utilised in interferometric sensor devices, that is precisely not desired in relation to interferometers for measuring displacement travel or distance. In the case of the interferometer head according to the invention therefore, beside the beam splitter and the recombination device, the light waveguides are also rigidly connected to a support body of the interferometer head at least in that region where reference and measuring beams extend in spatially separate relationship in the interferometer head (namely, there relative changes in the light waveguides and the light guide properties related thereto directly affect the measurement result). The support body of the interferometer head may also have a plurality of parts which are fixedly connected together and to which the individual optical components are fixed. The important consideration is that the spatial position of the beam splitter and the recombination device, the light waveguides which carry the measuring and reference beams in the interferometer head and the coupling-in and coupling-out lenses of the interferometer head when ready for operation is robustly fixed relative to each other so that, in the event of mechanical influences and effects which occur in a practical situation, there are no changes in position in respect of the above-mentioned fixed optical components, in particular the light waveguides, and thus no troublesome changes in the interference signal.

JP-A-143707 also discloses an interferometer in which light is guided in light waveguides and then coupled out by way of a lens on to a free measuring section. The light source and the photodetectors are directly fixed to the 'interferometer head'. There is therefore no feed of light by way of flexible optical fibers which can be connected by way of releasable fiber connectors. Moreover rigid fixing of the optical fibers in the 'interferometer head' is also not disclosed in JP-A-143707.

As already mentioned, the interferometer head according to the invention may be constructed in the form of a completely passive unit which does not need to contain any components which are mechanically moved in operation or active or passive electronic components. The interferometer head according to the invention can be constructed in the form of a compact structural unit which, for connection to the 'outside world', desirably only has the following:

An input by way of which laser light is fed from a laser light source to the interferometer head; one or more outputs by way of which the interferometer head lead from the focal point region of each coupling-in lens to a respective recombination device which is in the form of a waveguide coupler. That ensures that the measuring beam is constantly guided in a well-defined manner and in such a way as to be protected from external influences, within the interferometer head, prior to being coupled out on to the actual measuring section outside the interferometer head and after being coupled into the interferometer head. The reference beam will also desirably be guided throughout in a light waveguide, within the interferometer head. The reference beam which is guided in a light waveguide and the measuring beam which is guided in a light waveguide and which is returned from the measuring section can then be caused to interfere in a waveguide coupler acting as the recombination device, to form a clearly defined optical interference signal.

As already mentioned, in particular that region of the light waveguides in which the measuring and reference beams are guided in spatially separate relationship is critical. In order further to enhance the insensitivity of the interferometer head according to the invention, it is desirable, particularly when operating when polarized light, if one or more light waveguides which is or are preferably rigidly connected to the support body is or are provided for guiding the laser light from an input of the interferometer head to the beam splitter, at least in a portion-wise manner, and that one or more light waveguides which is or are preferably rigidly connected to the support body is or are provided for guiding the optical interference signal or signals, after the recombination device or devices, to at least one output of the interferometer head, at least in a portion-wise manner. With that arrangement, the laser light extends in the interferometer head practically exclusively in fixed light waveguides, in which respect, in regard to a defined condition of polarization of the laser light, it is desirable for the light waveguides to be disposed in the interferometer head substantially in one plane, preferably on a flat support.

Suitable light waveguides in the interferometer head are in particular optical fibers which are firstly flexible and which can be easily laid in the interferometer head. In that respect the optical fibers in the interferometer head can be laid at least in a portion-wise manner in the form of loops or turns or coils in order for example to avoid sharp bends. After the flexible optical fibers have been laid in position, in accordance with the invention they must be rigidly connected to the support body at least in that region where the reference and measuring beams extend separately. That can be effected in a simple fashion by the optical fibers in the interferometer head being stuck fast, at least in a place-wise manner and preferably substantially over their entire length, to the support body or a member fixed thereto. The optical fibers in the interferometer head can also be joined to the support body by casting or teeming the optical fibers with a hardening material, in which case the hardened material adheres firmly to the support body and defines a rigid spatial position for the optical fibers. The hardening material used may preferably be a resin which is thermosetting in the hardened condition. In general such materials are achieved by mixing a binder with a hardener, thereby firstly producing a material which is more or less viscous and which then hardens (generally at room temperature). A desirable hardening material is for example an epoxy resin. Epoxy resins have the advantage that they involve a slight degree of shrinkage when they harden and therefore harden in a practically stress-free condition. In addition epoxy resins in the hardened condition are tough in relation to impact and have good adhesion to most materials. It will be appreciated that in principle other hardening materials are also suitable for casting of the optical fibers in the interferometer head. Desirably it is not only the optical fibers which carry the measuring beam and the reference beam that are cast or teemed in position by means of a hardening material. On the contrary it is preferably provided that all optical components of the interferometer head with light waveguide, preferably together with the coupling-in and coupling-out lenses and the holders thereof, and the support body, are cast together. When the material has hardened, that gives a robust interferometer head unit which is fixed in terms of its setting and adjustment, while in addition the casting operation, besides providing 'rigidness', also provides insulation relative to the environment ( for example in relation to heat, sound, etc ) and the entire interferometer head is thereby rendered insensitive to fluctuations in the ambient conditions. Although a rigid support body, for example consisting of metal, appears to be favourable for a moment, it is in principle also possible to envisage the hardened material with which the optical components and light waveguides of the interferometer head are cast or teemed in position itself forming the support body.

In order to give improved protection in relation to mechanical influences and enhanced insulation in relation to the environment, in accordance with a preferred embodiment of the interferometer head according to the invention, it is desirable if the support body is surrounded by a housing which is fixedly connected thereto, or itself forms a housing. The support body and/or the housing advantageously comprise metal which enjoys a high level of mechanical strength and good thermal conductivity whereby local temperature differences in the interferometer head can be extensively avoided. By applying insulating or barrier materials, it is possible to provide insulation relative to the environment and thus achieve insensitivity in relation to relatively rapid fluctuations in the ambient conditions (in particular temperature). Gradual adaptation of the temperature of the interferometer head to the ambient temperature cannot of course be avoided. In order reliably to avoid the interference signal being adversely affected when 'slow' changes in temperature of that kind occur, in accordance with a preferred embodiment of the invention it is provided that the path followed by each of the reference beams in the light waveguide between the beam splitter and the recombination device is of substantially the same length as the sum of those paths covered by the measuring beam in the interferometer head in light waveguides. In the event of a change in temperature, the light waveguide portions in which the reference beam or beams are guided and the light waveguide portions in which the measuring beam is guided expand to the same degree so that the change in temperature does not cause any undesirable phase shift in respect of the optical interference signal or signals.

In accordance with a preferred embodiment of the invention the housing of the interferometer head is of a tub-like or trough-like configuration, wherein at least a large part of the optical components of the interferometer head together with light waveguides are arranged in the region of the housing tub or trough, preferably in the region of a tub or trough bottom which is of a flat configuration. The optical components and light waveguides can be disposed in a simple and protected manner in such a trough-like housing. In addition, such a housing can be easily filled with a hardening material, in which case all optical components with light waveguides are cast together, possibly after adjustment of adjustable components (for example the coupling-in and coupling-out lenses). A particularly high degree of protection is achieved if the housing is closed on all sides or if it can be closed by a releasably fixed cover or the like.

The coupling-in and coupling-out lenses which are desirably arranged in the region of the wall of the housing of the interferometer head can be rigidly connected to the support portion of the interferometer head. It appears to be more desirable however if the coupling-in and coupling-out lenses are adjustably mounted on the support portion, preferably by way of adjustable lens holders, and can be arrested in the set position, preferably by way of fixing means. In that way, the orientation of the coupling-out lens and the coupling-in lens can be correctly established and fixed once and for all by the manufacturer of the interferometer head. The correctly set lenses with lens holders can then be fixedly cast in the interferometer head for example together with the optical components and light waveguides. In general the coupling-out lens and the coupling-in lens will be oriented in parallel relationship with each other and the measuring mirror used will be a retroreflector which, irrespective of tilting thereof, reflects the measuring beam issuing from the coupling-out lens, parallel to itself. Then, by virtue of the parallel orientation of the coupling-in and coupling-out lenses, the measuring beam returning from the retroreflector is correctly coupled byway of the coupling-in lens into an input light waveguide.

Although it is also possible to envisage a feed of light from the laser light source to the interferometer head, in which the light passes freely through the ambient air, it is certainly advantageous, in regard to substantially simplified handling of the interferometer head, if the supply of laser light is by way of a flexible optical fiber, in that case the interferometer head can be fixedly connected to an optical fiber. It is more advantageous however if the interferometer head has a releasable fiber connector for connection to such a laser light-carrying optical fiber. The same considerations as regards the supply of light apply in regard to transmission of the optical interference signals out of the interferometer head to a photoelectric detector unit outside the interferometer head. Here too flexible optical fibers are advantageous, which can be fixedly connected to the interferometer head or—which is more advantageous—are connected to the interferometer head by way of at least one releasable fiber connector. Handling is considerably facilitated by virtue of such a releasable connection between the interferometer head and flexible optical fibers. For example, the flexible optical fibers can be easily laid in position before they are attached to the interferometer head by way of the releasable fiber connector. In addition, in the event of damage, the flexible optical fibers which lead to and from the interferometer head can be quickly and easily replaced. An interferometer head which has suffered damage due to the effect of a large force thereon could also be quickly and easily replaced in that way. In principle the releasable fiber connectors could be disposed outside the interferometer head on optical fiber portions which are connected to the interferometer head. More advantageous however is a preferred embodiment which is characterised in that the fiber connector or connectors for the releasable connection of one or more flexible optical fibers to the interferometer head is or are each in the form of a two-part fiber coupling, wherein the part of each fiber coupling, at the interferometer head side, is connected to one or more light waveguides in the interferometer head and is connected to the support body or the housing of the interferometer head or is formed thereon, and wherein the other part of each fiber coupling, which corresponds to the part at the interferometer head side, is connected to one or more flexible optical fibers. Such an interferometer head can be constructed in the form of a compact unit, into which and out of which initially no optical fibers pass. The interferometer head has as its input, the part of a fiber coupling at the interferometer head side. The other part of the fiber coupling is disposed on a flexible optical fiber which carries laser light from the laser light source. By the two parts of the fiber coupling being joined (for example by being fitted together), laser light can be fed to the interferometer head from the laser light source by way of the input. The situation is similar in regard to transmission of the optical interference signals out of the interferometer head. Here too a two-part fiber coupling is advantageous, with the part at the interferometer head side being connected to the support body or housing of the interferometer head and forming the output thereof. One or more optical fibers may be provided for transmission of the optical interference signals; the one or more optical fibers are connected to a part of the fiber coupling which fits into the part of the fiber coupling at the interferometer head side, at the output of the interferometer head. If the arrangement has a plurality of flexible optical fibers for the transmission of optical interference signals from the interferometer head to a photoelectric detector unit, those optical fibers can each be connected to the interferometer head by way of its own two-part fiber coupling. It is however also possible for all such flexible optical fibers to be jointly connected to the interferometer head by way of a multiple fiber coupling.

While the position of the optical components and light waveguides in the interferometer head is already fixed, the interferometer head as a whole must be so aligned and oriented at the position of use that the measuring beam extends parallel to the displacement travel of the measuring mirror. In order to ensure that happens in a simple fashion, it may be provided in accordance with a preferred embodiment of the invention that the interferometer head is mounted adjustably on a base portion. The base portion may be for example a base plate which belongs to the interferometer head. On the other hand however the base portion may also be formed by a machine portion or the like, to which the interferometer head is to be fixed. The interferometer head advantageously has adjustable adjusting elements in order to fix the spatial position of the support body relative to the base portion.

A preferred structural configuration provides that the support body is connected to the base portion by way of a ball joint-like connection and the adjusting elements on the interferometer head include displaceably mounted screws which each bear with their preferably rounded tip against a surface of the base portion. That permits adjustment of the support body of the interferometer head in all directions in space.

The invention further concerns an interferometer arrangement having an interferometer head of a configuration in accordance with the invention, comprising a laser light source which is arranged outside the interferometer head and the laser light from which is fed to the interferometer head, a photoelectric detector device arranged outside the interferometer head for detecting and evaluating at least one optical interference signal from the interferometer head and, arranged outside the interferometer head, a movable measuring mirror or a reflecting measuring surface for reflecting the measuring beam issuing from the interferometer head back to the interferometer head.

The interferometer arrangement according to the invention advantageously has at least one respective flexible optical fiber for the feed of laser light from the laser light source to the interferometer head and/or for transmission of the optical interference signals from the interferometer head to the photoelectric detector unit. The flexible optical fibers may not only have a releasable fiber connector at the end towards the interferometer head, but rather it is preferably provided that a releasable, preferably two-part fiber connector is provided respectively for the flexible optical fibers at the end towards the interferometer head and at the opposite end. In that way the flexible optical fibers can not only be plugged into and unplugged from the interferometer head in a simple fashion, but on the contrary that also provides a releasable connection in the region of the laser light source and the photoelectric detector device respectively.

That means that it is possible to use flexible optical fibers of lengths which vary according to the respective situation of use and which in addition can be quickly and easily replaced in the event of damage. A monomode glass fiber in which there are well-defined wave fronts is particularly suitable for the flexible optical fiber for the laser light feed. The use of a polarization-maintaining optical fiber appears to be particularly advantageous for the laser light feed as under some circumstances, when using 'normal' monomode optical fibers, movement of such optical fibers (for example when laying same or also in operation) can result in undesirable changes in the state of polarization of the light, and such changes can falsify the optical interference signals and therewith the measurement result.

It is also advantageous for the light to be guided in the interferometer head in single-mode waveguides, for example in monomode glass fibers. Single-mode waveguides of that kind give well-defined wave fronts and that therefore provides well-defined optical interference signals upon recombination of the measuring and reference beams.

Multimode optical fibers are sufficient for transmission of the optical interference signals from the interferometer head to a photoelectic detector unit.

The interferometer arrangement according to the invention may also have a plurality of preferably similar interferometer heads which are desirably all connected to a common laser light source by way of flexible optical fibers. It is also desirable for all interferometer heads to be connected to a central photoelectric detector device. If each interferometer head has its own movable measuring mirror associated therewith, it is then possible to produce for example an interferometer arrangement with which measurements can be taken in all three directions in space.

Further advantages and details of the invention will be described in greater detail in the following specific description.

FIG. 3 is a view in vertical longitudinal section through the interferometer head shown in FIG. 2, wherein the longitudinal section is through the coupling-out lens and the interferometer head is already teemed or filled with a hardened resin.

FIG. 4 is a simplified diagrammatic plan view of an embodiment of the interferometer head according to the invention.

Figure 8:
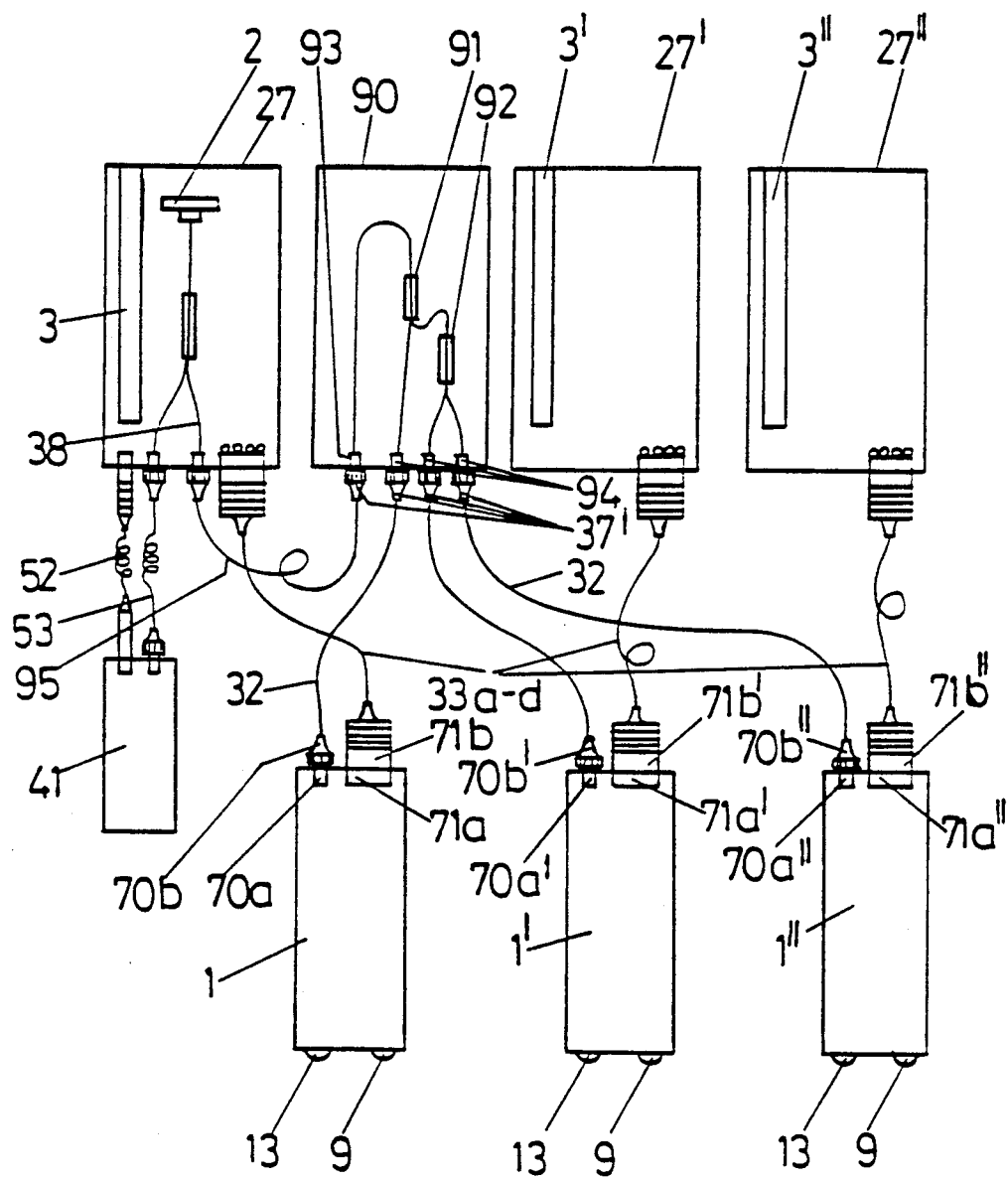

FIG. 8 finally shows an embodiment of the interferometer arrangement according to the invention with three substantially identical interferometer heads.

Figure 1:
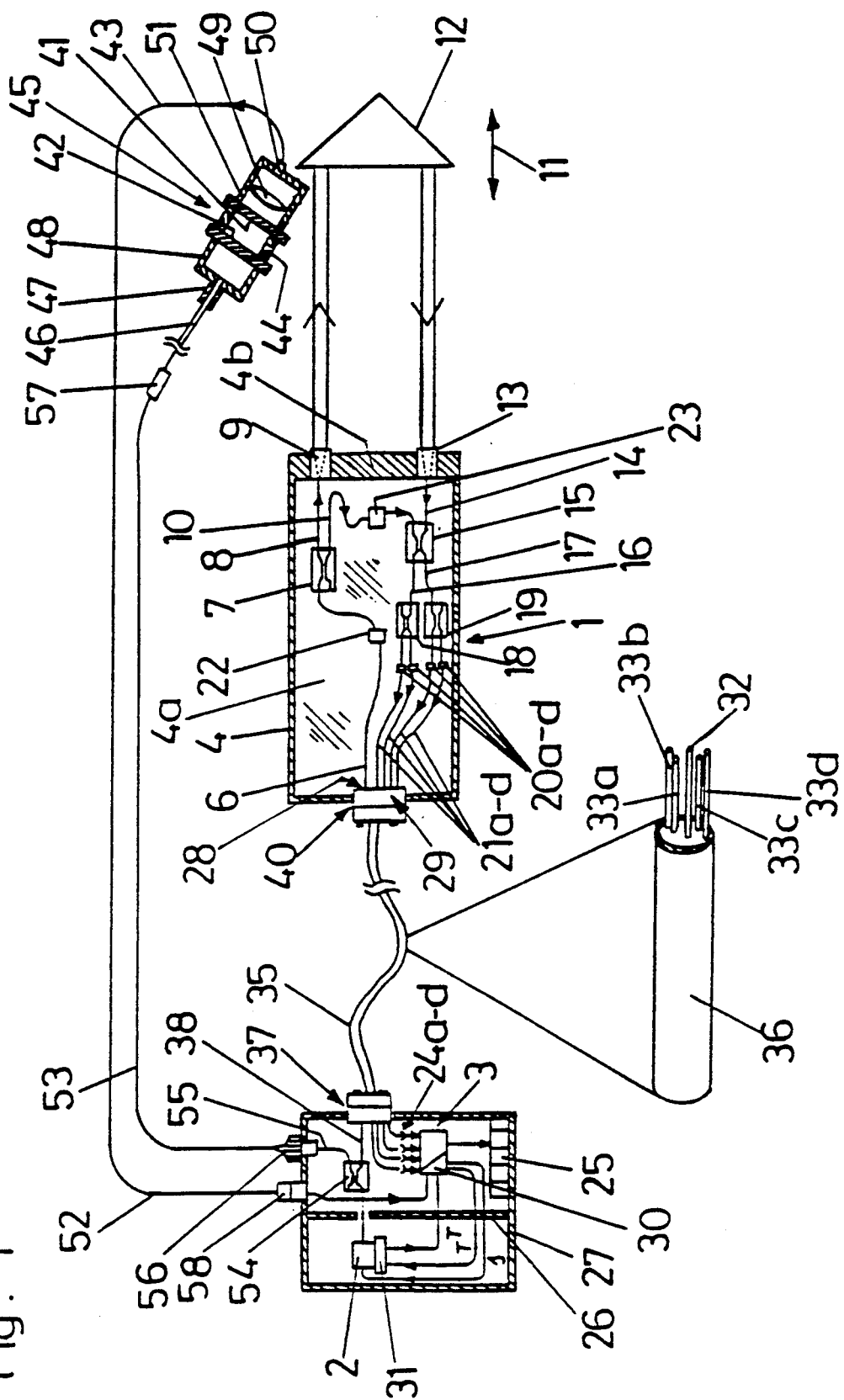
FIG. 1 is a diagrammatic view of an embodiment of the interferometer arrangement according to the invention with an interferometer head in accordance with the invention, a part of the optical fiber cable leading to and from the interferometer head being shown on an enlarged scale.

The interferometer arrangement shown in FIG. 1 has an interferometer head according to the invention, a laser diode 2 as the laser light source for supplying the interferometer head 1 with laser light and a photoelectric detector device 3 for evaluation of the optical interference signals coming from the interferometer head. The interferometer head 1 is enclosed by a closed housing 4 of metal and in its interior contains a plurality of optical components which are connected by monomode glass fibers and which are described in greater detail hereinafter. The laser light from the laser diode 2, which passes into the flexible optical fiber 6, goes to a beam splitter 7 which effects division into measuring and reference beams. The measuring beam is passed by way of the monomode glass fiber 8 and the coupling-out lens 9 (gradient index lens) on to the measuring section which lies outside the interferometer head and which extends in the ambient medium. The reference beam extends in the reference fiber 10 in the interferometer head 1. The retroreflector 12 is fixed to a component (not shown) which is displaceable in the direction indicated by the double-headed arrow 11. The retroreflector 12 reflects the measuring beam back to the interferometer head 1, with a beam displacement. The measuring beam passes into the glass fiber 14 by way of a separate coupling-in lens 13. In the recombination device 15 which is in the form of a phase coupler, the measuring beam returning from the measuring section and the reference beam which is passed through the reference fiber 10 are caused to interfere. Two further beam splitters 18 and 19 are connected to the two complementary outputs 16 and 17 of the recombination device 15. The phase-shifted optical interference signals pass byway of polarization filters 20a–d into the flexible optical fibers 21a–c which lead to the detector device 3.

The direction of displacement and the modulation swing of the interference signal can also be ascertained, in known manner, besides the displacement travel of the retroreflector 12, from the four interference signals which are each phase-shifted through 90° relative to each other. The illustrated interferometer arrangement is therefore operated with two mutually perpendicular polarization effects. For that purpose, there is provided a polarizer 22 which is oriented at 45° relative to polarization filters 20a–d. Both polarization components pass through the same measuring section. Arranged in the reference line 10 is a λ/4-plate (quarter-wave plate) 23 in order to shift one polarization direction through 90° relative to each other, in respect of phase.

The detector device 3 has four photodetectors 24a–d. Those four photodetectors 24a–d produce from the optical interference signals electrical signals which are evaluated by an electronic unit. The result (the position of the retroflector 12) is displayed by means of a display 25. The laser diode 2 is disposed in a region of the light source and evaluation housing 27 which is spatially separate from the interferometer head; that region of the housing is divided off by a heat-insulating wall 26.

In the embodiment shown in FIG. 1, the housing 4 with the flat bottom 4a forms a rigid support body to which the beam splitter 7 and the recombination device 15 are rigidly connected for example by adhesive. In accordance with the invention, the optical fiber portions 8 and 14 which carry the measuring beam as well as the reference fiber 10 which carries the reference beam are also rigidly connected to the support body or housing bottom 4a.

In that way, in critical regions where the reference and measuring beams extend in spatially separate relationship within the interferometer head 1, there cannot be any change in the position of the initially flexible optical fiber portions 8, 10 and 14. More specifically, such changes in position could cause changes in the optical interference signals which are produced by the recombination device, in an undesirable fashion. However the aim is that only a movement of the measuring mirror 12 produces such a change in the optical interference signals so that finally the correct position or the correct displacement travel of the retroreflector 12 is displayed by means of the display 25. In order to achieve the necessary 'rigidity' of the connection between optical fibers and support body of the interferometer head, it is generally sufficient if the optical fibers are glued fast to the support body in a place-wise manner. It will be appreciated that a still better connection between optical fibers and support body is achieved if the optical fibers are connected to the support body over their entire length, for example by being glued fast thereto.

In accordance with the invention the coupling-out lens 9 and the coupling-in lens 13 of the interferometer head when ready for operation are rigidly connected to the support body of the head. In the embodiment shown in FIG. 1, the coupling-in and coupling-out lenses 9, 13 are rigidly fitted into the front wall 4b of the housing 4 which forms the support body. Exact parallel orientation of the two lenses 9 and 13 which ensures that the measuring beam reflected back by the retroreflector 12 is actually coupled into the optical fiber 14 is achieved in this embodiment by virtue of the fact that the lenses 9 and 13 are fitted into exactly parallel bores in the metal front wall 4b of the housing 4, for example being glued therein, the cylindrical outside surfaces of the lenses 9 and 13 bearing against the inside wall of the respective bores. Parallel bores of that kind can be accurately produced at relatively low cost.

Overall, the beam splitter 7, the recombination device 15, the two lenses 9 and 13, the optical fiber portions 8 and 14 which carry the measuring beam and the reference fiber 10 which carries the reference beam are rigidly connected to the interferometer head housing 4 (support body), thereby providing a structural unit which is insensitive to the effects of pressure, shock and impact. That lack of sensitivity to mechanical influences is further enhanced by virtue of the fact that the other components and optical fibers in the interferometer head are also rigidly connected thereto, for example by adhesive. In particular, an optical fiber 6 which is rigidly connected to the interferometer head housing 4 is provided for guiding the laaser light from the input 28 of the interferometer head 1 to the beam splitter 7, and optical fibers 16, 17 and 21a-d which are also rigidly connected to the housing 4 are provided for guiding the optical interference signals downstream of the recombination device 15 to the output 29. In addition, the substantially closed housing 4 which for example can be sealingly closed by a releasably fixed cover affords protection from mechanical interference influences. Furthermore, such a housing enhances the level of insensitivity in relation to fluctuations in ambient conditions. In order not to have any undesired changes in the interference signal in the event of fluctuations in temperature which, with the passage of time, are also transmitted to the interior of the housing 4, it is provided that the sum of the lengths of the optical fiber portions 8 and 14 is approximately equal to the length of the reference fiber 10 (reference beam). When fluctuations in temperature occur, all those optical fibers expand to the same degree so that there is no relative phase shift between the measuring and the reference beam and thus no change in the optical interference signal in the recombination device when the measuring mirror 12 is stationary.

The optical fibers in the interferometer head 1 are laid substantially in one plane (lying on the flat bottom 4a of the housing 4), so that there are no uncontrolled changes in the state of polarization of the laser light which is carried in the optical fibers.

A flexible monomode glass fiber 32 is provided for the feed of laser light from the laser light source 2 to the interferometer head 1. In that way the small compact interferometer head can be disposed in the correct orientation at a suitable position for the measurement operation, irrespective of the relatively bulky light source and evaluation housing 27. Particularly when operating when polarized light, it is desirable for the feed optical fiber 32 to be a polarization-maintaining optical fiber because then that gives a well-defined state of polarization in respect of the laser light, independently of shifting of the optical fiber at the input 28 or at the beam splitter 7.

The present embodiment has four multimode flexible optical fibers 33a-d for transmission to the photoelectric detector device 3 of the optical interference signals (being four in the present embodiment). A high degree of insensitivity to electromagnetic stray effects is achieved by that optical transmission of the four phase-shifted interference signals from the interferometer head.

The flexible monomode optical fiber 32 by way of which laser light is fed to the interferometer head and four plastic optical fibers 33a-d by way of which optical interference signals are fed to the photodetectors 24a-d from the optical fibers 21a-d are combined together in a cable which is enclosed by a sheath 36. At the end towards the light source, the fiber cable 35 is releasably connected by way of a two-part multiple fiber connector 37 to optical fibers in the light source and evaluation housing 27. More specifically the optical fiber 38 coming from the laser diede is releasably connected to the monomede glass fiber 33. The four plastic optical fibers 33a-d of the fiber cable 35 are connected by way of the plug 37 to optical fibers which lead to the photodetectors 24a-d.

At the end of the fiber cable 35 which is towards the interferometer head is a second multiple fiber connector 40 (fiber coupling) for releasable connection of the optical fibers of the fiber cable 35 to corresponding fibers in the interferometer head. More specifically the monomode glass fiber 32 is connected to the monomode glass fiber 6 by way of the two-part plug-in fiber coupling 40. The optical fibers 21a-d are also optically coupled to the optical fibers 33a-d of the fiber cable 35. The part of the fiber coupling 40, which is towards the interferometer head, is fixedly connected to the housing 4 of the interferometer head 1 while the other part which fits into that part of the fiber coupling is connected to the fiber cable 35. In that way the optical connection between the fiber cable and the interferometer head can be made and released again quickly. The fiber cable 35 can be easily adapted to the respective conditions of use, having regard to the optical minimum length, it can be easily laid in position, and it can be easily and quickly replaced in the event of damage. The replacement operation can even be carried out by the user as there is no need for time-consuming and costly adjustment following the replacement operation.

As in the case of the interferometer arrangement according to the invention, the actual measuring section extends for the most part in a gaseous ambient medium (generally air) and there the relevant light wavelength varies with the refractive indices which are dependent on the ambient conditions, that refractive index and the wavelength in the gaseous medium must be known in order to achieve very high levels of accuracy. For that purpose it is possible to operate in air-conditioned spaces in which the ambient conditions and thus the refractive index are kept substantially constant. Generally speaking however such spaces are not available. In that case it is possible in principle to ascertain the refractive index and light wavelength in the gaseous ambient medium by means of one of the known methods of determining refractive index or wavelength. A suitable method for example is the parameter method in which temperature, pressure, humidity and possibly the gas composition of the ambient air are ascertained and the refractive index is calculated therefrom. There is also the possibility however of ascertaining the light wavelength in the gaseous ambient medium by comparison with a static measuring configuration (standard). In the present embodiment, compensation, which is described in greater detail hereinafter, in respect of variable ambient conditions (fluctuations in the refractive index of the ambient medium on the measuring section) is effected by means of a static standard 41, between whose partially transmissive reflection surfaces 42 and 43 is a spatial region communicating with the ambient medium by way of the opening 44. The length of the standard 41 (spacing of the parallel, partially transmissive reflection surfaces 42 and 43) is known and is typically a few millimeters. A ring 45 with a negligibly low coefficient of thermal expansion (for example of glass ceramic) holds the two reflection surfaces 42 and 43 at the desired known spacing. The standard is connected to a flexible optical fiber 46 which carries light from the laser diode 2 and which is illustrated by a single line, except for the region entirely at the standard 41 (like all other optical fibers). The optical fiber 46 makes it possible for the standard to be arranged at a suitable position and location in the region of the measuring section without optical components which are costly and time-consuming to adjust. That ensures that the same ambient conditions (refractive index) actually obtain on the measuring section along which the retroreflector 12 moves and between the reflection surfaces 42 and 43 of the standard.

In order to provide for satisfactory adjustment of the end of the glass fiber relative to the reflection surfaces 42 and 43, that end is held by an annular holding device 47 which is mounted on a spacer 48. That constantly ensures the required angular accuracy in terms of optically guiding the beam.

In the present embodiment the optical fiber 46 is a monomede glass fiber, the end of which represents an ideal point light source. Behind the reflection surface 43 that gives a precise, uniformly illuminated interference ring system, the image of which is formed by the lens 49. A differential diode 50 which is fixed to a holder 51 like the lens detects an interference ring of the interference ring system and, in dependence on the position of the interference ring, supplies a signal to the laser diode regulating circuit 31 by way of an electric line 52 connected by means of the plugs 58.

The emission frequency of the laser diode 2 is regulated on the one hand by way of injection current and temperature and on the other hand by frequency-selective optical feedback from the standard 41 in the interferometer head 1. The ambient medium which is present on the measuring section is to be found between the two reflection surfaces 42, 43 of the standard 41, which are spaced at about 5 mm. If the refractive index of the ambient medium and therewith the air wavelength in the standard 41 changes, then the position of the interference ring detected by the differential diode 50 also alters. The regulating unit 30 thereupon corrects the operating parameters of the laser diode by way of injection current I and laser diode temperature T (Peltier element 31) in such a way that the emission frequency alters so that the air wavelength on the measuring section (and in the standard 41) remains constant. In addition to that electronic regulation of the emission frequency, optical regulation of the laser diode is also effected by a procedure whereby, in dependence on the refractive index of the ambient medium between the mirror surfaces of the standard 41, light is fed back into the laser diode in a frequency-selective fashion and causes the laser diode preferably to emit at that frequency. It will be noted that a colinearly illuminated standard (not shown here) appears to be more advantageous in terms of producing such an optical feedback signal.

Arranged between the optical fiber 46 connected to the standard 41 and the optical fiber 55 which is supplied with laser light by way of the beam splitter 54 is a further optical fiber 53 whose end which is towards the light source is releasably connected to the optical fiber 55 by way of a first fiber connector 56 on the housing 27, while its end which is towards the standard 41 is releasably connected (fiber connector 57) to the optical fiber 46 connected to the standard 41. That further optical fiber can be easily laid in position, it can be readily adapted to the respective conditions obtaining in terms of its length, and it can be easily replaced in the event of damage.

In order to ensure that the emission frequency of the laser diode is not undesirably influenced by uncontrollable frequency-selective feedback effects, as occur for example from the 'quasi-standard' between the outside surface of the laser diode resonator and the first mirror surface of the standard 41, it is desirably provided that disposed between the laser diode 2 and the standard 41 is an optical fiber 53 whose optical length is at least 1 meter. For similar considerations, the optical length of the optical fiber 32 arranged between the laser diode 2 and the interferometer head 1 is desirably at least one meter.

Figure 2:
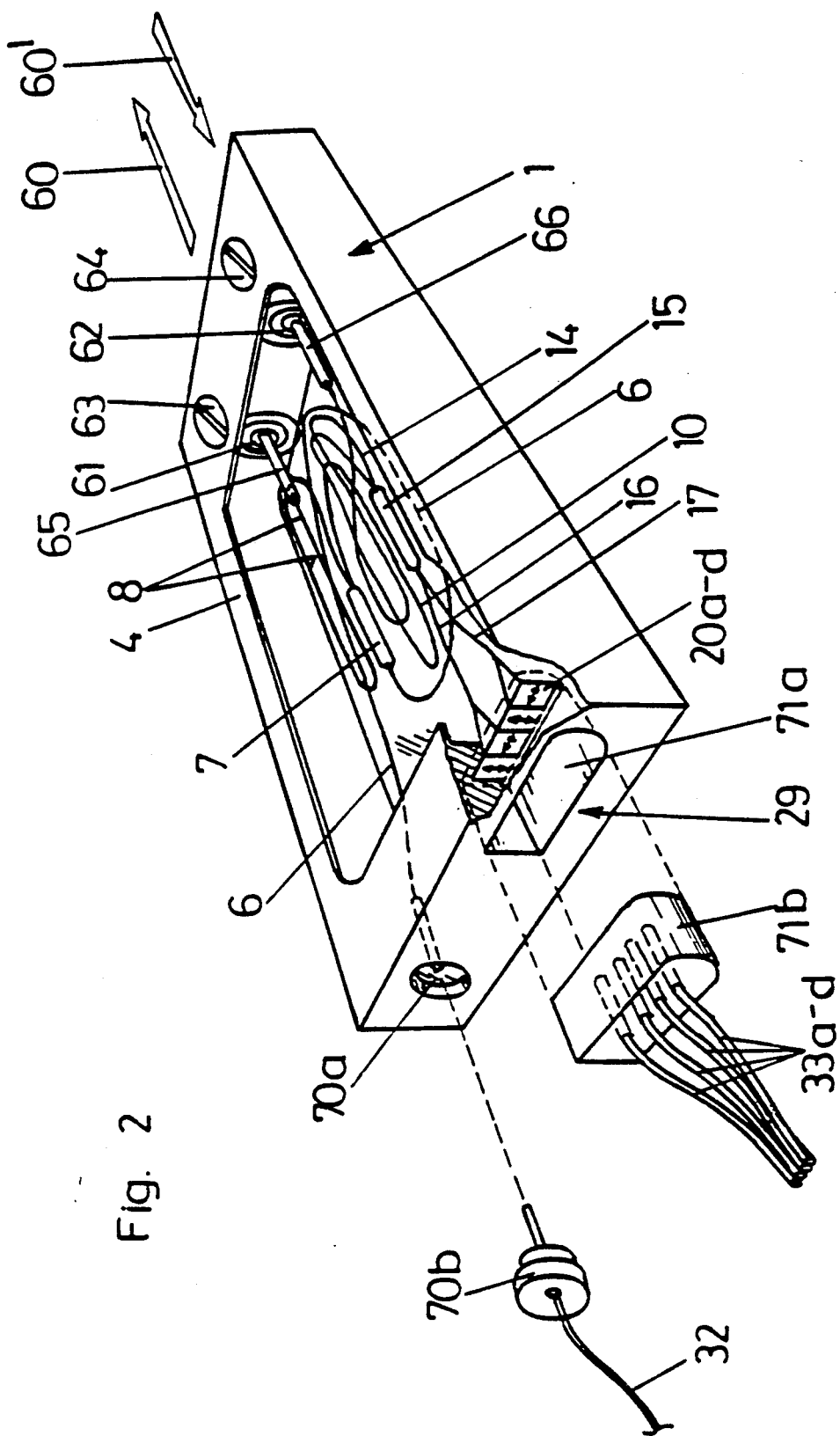
FIG. 2 shows a perspective view of an embodiment of the interferometer head according to the invention, wherein the tub-like or trough-like housing of the interferometer head is still to be teemed or filled with a hardening material.

FIG. 2 is a perspective view of an embodiment of the interferometer head according to the invention having a housing 4 which is of a tub-like or trough-like configuration and in which the optical components of the interferometer head together with the optical fibers are arranged, preferably in the region of the trough bottom which is of a flat configuration (see also FIG. 3 which shows a longitudinal section). In particular, arranged in the region of the trough bottom 4a is a beam splitter 7 which is in the form of a fiber coupler and which divides the laser light supplied by way of the optical fiber 6 into a measuring beam (optical fiber 8) and a reference beam (optical fiber 10). In addition, disposed in the region of the trough bottom 4a is a recombination device 15 which is also in the form of a 2×2-fiber coupler and in which the measuring beam returning from the measuring section and the reference beam carried in the reference fiber 10 are caused to interfere. The recombination device 15 has two output optical fibers 16 and 17 which carry complementary optical inference signals. Those two optical fibers 16 and 17 terminate freely at a spacing in front of the polarizers 20a–d so that the exit light cones from the optical fibers 16 and 17 respectively each involve two polarizers 20a–20d so that four phase-shifted optical interference signals are available at the output 29 of the interferometer head 1. The relative phase shift between the two polarization directions which are projected out through the polarizers 20a–d and which pass along the same geometrical paths can be achieved with a λ/4-plate (not shown) or by the two polarization directions experiencing a different phase change in the retroreflector (not shown). The retroreflector is so arranged as to reflect the outgoing measuring beam 60 back to the interferometer head 1 with a parallel displacement (incoming measuring beam 60′).

In the embodiment illustrated in FIGS. 2 and 3, the coupling-in and coupling-out lenses are displaceable by way of displaceable lens holders 61 and 62 respectively, they are mounted on the housing 4 (support body) in the front wall 4b thereof and can be arrested in the set position by way of arresting screws 63 and 64 respectively. The lens holder is of the same configuration for the coupling-in lens and the coupling-out lens 9 and is described with reference to FIG. 3 (in relation to the coupling-out lens 9 ). The lens holder 61 essentially comprises a metal ball 61 with a bore therethrough into which is fitted the coupling-out lens 9. Screwed into the metal ball 61 from the other side is a holding tube 65 which guides the output optical fiber 8 in the region of the lens holder. The output optical fiber 8 terminates in the focal point region F of the coupling-out lens 9. The spacing of the end of the output optical fiber 8 from the lens 9 and therewith the divergence of the outgoing measuring beam 60 can be adjusted by screwing the holding tube 65 into the metal ball 61 to varying degrees. The output optical fiber 8 extends continuously from the beam splitter 7 which is in the form of a waveguide coupler to the focal point region F of the coupling-out lens 9. In the case of the coupling-in lens (not shown in detail in FIG. 3), a continuous light waveguide also extends from the focal point region of the coupling-in lens through the holding tube 66 to the recombination device 15 which is also in the form of a waveguide coupler (fiber coupler). Orientation of the coupling-out lens 9 and thus the direction of the coupled-out measuring beam 60 is effected by adjustment of the position of the metal ball holder 61 relative to the housing 4, the holding tube 65 providing a point of engagement for such adjustment. After adjustment has been effected, the arresting screw 63 is screwed in and the metal ball 61 is clamped fast. That operation of setting the lenses can already be carried out at the manufacturer.

In order now in accordance with the invention for the optical components and the optical fibers which are laid in a loop-like configuration at least in a portion-wise manner to be rigidly connected to the housing 4 (support body) or the insert 4d which is fixedly connected thereto, it is provided in the present embodiment that the housing trough is teemed or filled with a hardening material. That material 67 is shown in FIG. 3. In the hardened condition, besides fixing the components and optical fibers, the material 67 provides additional insulation and thus enhances the insensitivity of the arrangement in relation to fluctuations in ambient conditions. The material which adheres firmly to the housing 4 may be a resin which is thermosetting in the hardened condition. A suitable material for example is an epoxy resin. After the casting operation, the interferometer head can be additionally closed by a cover 68.

A two-part fiber coupling is provided for connection of the laser light-carrying flexible optical fiber 32 to the interferometer head 1. The part 70a of the fiber coupling, which is towards the interferometer, is provided in the rear wall 4c of the interferometer head housing 4 while the part 70b which is towards the light source is connected to the optical fiber 32. The parts 70a and 70b fit positively one into the other. The situation is similar for releasable connection between the plastic optical fibers 33a-d and the interferometer head. Here too there is a two-part (multiple) fiber coupling whose part 71a which is towards the interferometer head is provided in the rear wall 4c of the housing of the interferometer head 1 while the part 71b which is towards the detector is connected to the optical fibers 33a-d. Rapid connection of the optical fibers to the interferometer head is possible by way of the releasable fiber couplings.

The interferometer head of which a plan view is shown in FIG. 4 is of a similar configuration to the interferometer head shown in FIGS. 2 and 3. Apart from the way in which the optical fibers are laid in the interior of the interferometer head, the difference is essentially that light division to the polarizers 20a-d is effected by separate beam splitters 18, 19 (fiber couplers), as is already shown in FIG. 1. Otherwise the same reference numerals identify the same or equivalent parts as in the preceding Figures. It will be appreciated that the embodiments shown in FIG. 4 also provide that the optical fibers and the essential optical components of the interferometer head are rigidly connected to the housing 4 (support body) of the interferometer head.

Figure 5:
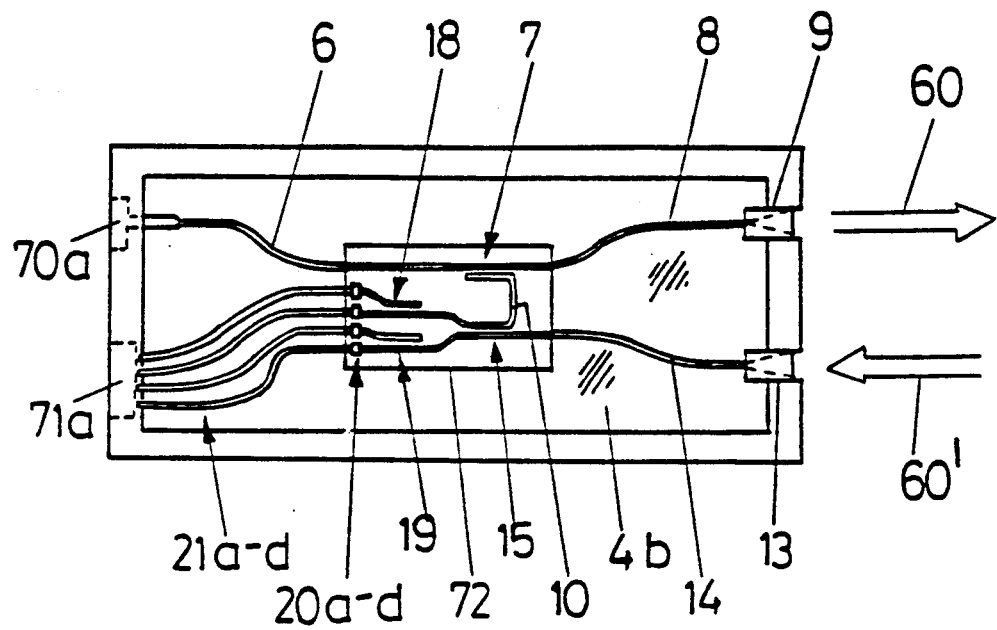
FIG. 5 shows an embodiment in which the central optical components of the interferometer head and a part of the light waveguides are integrated on a carrier substrate.

In the embodiment shown in FIG. 5, the essential optical components, in particular the beam splitter 7 and the recombination device 15 as well as a part of the light waveguides are provided on a carrier substrate 32. The light waveguides are waveguide tracks which are diffused into the substrate. The carrier substrate for which for example glass or lithium niobate is a suitable material, is glued fast to the housing bottom 4b. Initially flexible light waveguides 6, 8, 14 and 21a-d are provided for connection of the waveguide tracks on the carrier substrate 72, to the components which are disposed outside the carrier substrate. The light waveguides are then rigidly connected to the housing 4 (support body), in accordance with the invention.

Figure 6:
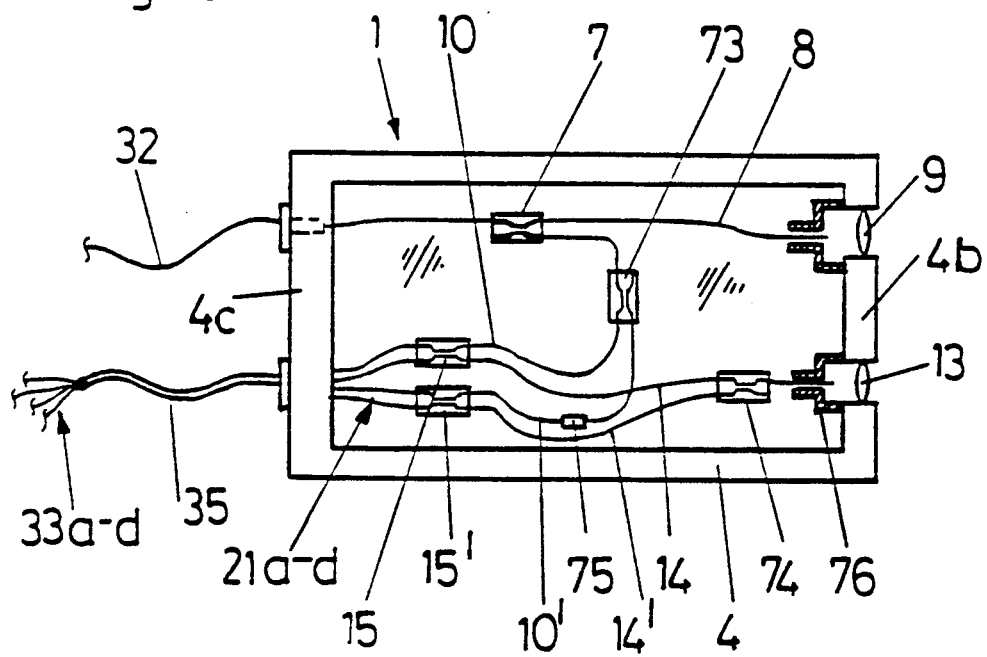
FIG. 6 is a diagrammatic view of an embodiment in which four phase-shifted outputs are produced by division of the reference and measuring beams and by two recombination devices.

In the previous embodiments, the four phase-shifted outputs were achieved using two different polarization effects. In the embodiment shown in FIG. 6, four phase-shifted interference signals are obtained on the lines 21a-d and 33a-d respectively by the use of two recombination devices 15, 15′ and by the reference beam being divided into two. Division of the reference beam into two reference fibers 10 and 10′ which extend in spatially separate relationship is effected in the beam splitter 73. The measuring beam which returns from the measuring section (not shown) and which is coupled in by way of the coupling-in lens 13 is divided in the beam splitter 74 on to two optical fibers 14 and 14′ which extend in spatially separate relationship. By way of the trimming device 75 in the reference fiber 10′, the phase position of the reference beam portion which is carried therein can be altered in such a way that four optical interference signals which are each phase-shifted for example through 90° respectively are available on the output optical fibers 21a-d. In the embodiment shown in FIG. 6, the optical fibers are held in the region of the coupling-in and coupling-out lenses 13 and 9 respectively by rigid fiber holders 76.

Figure 7:
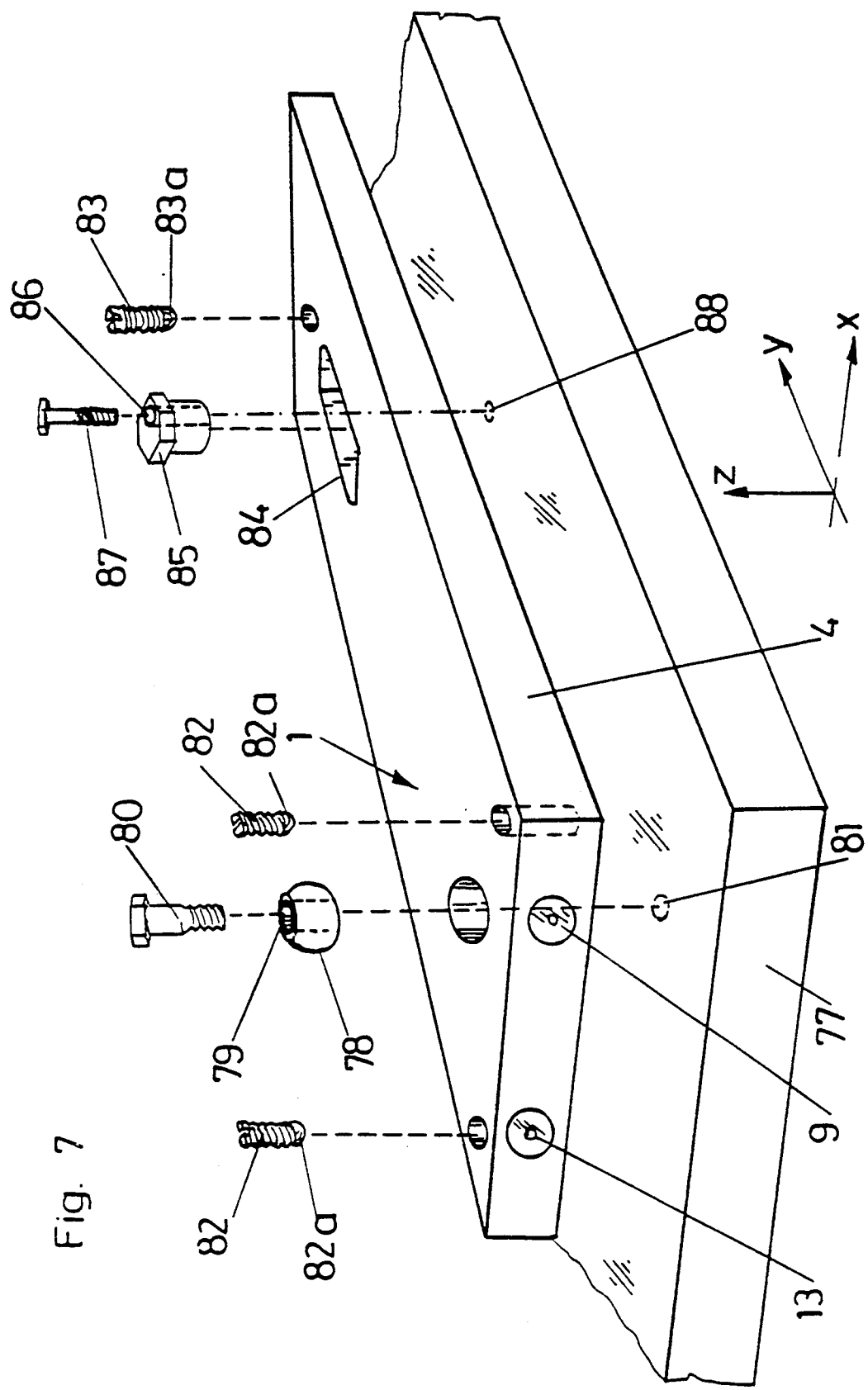
FIG. 7 is a diagrammatic view of a substantially closed interferometer head with the adjusting elements for fixing the spatial position of the interferometer head.

In order to be able to orient the interferometer head 1 as a whole so that for example the outgoing measuring beam extends parallel to the displacement travel of a retroreflector, the interferometer head or its housing 4 (support body) is mounted adjustably on a base portion 77 (see FIG. 7). In order to fix the spatial position of the interferometer head 1 relative to the base portion 77, the latter has numerous adjusting and fixing elements which are described in greater detail hereinafter.

The interferometer head can be connected to the base portion 77 by way of a ball joint-like connection.

As shown in FIG. 7, for that purpose there is provided a ball 78 which can be fitted into the interferometer head or the support body 4 thereof and which is provided with a bore 79. A fixing screw can be screwed through the bore 79 into a screwthread 81 in the base portion 77. In that way the interferometer head is connected to the base portion 77 but by virtue of the ball joint-like connection it can still be oriented in all directions in space. In order to establish the rotational position about the Y-axis (see the small co-ordinate system in FIG. 7), there are two adjusting screws 82 which are adjustably mounted in the interferometer head and whose tips 82a, which are of a spherically rounded configuration, come to bear against the flat surface of the base portion 77. For the purposes of adjusting the rotational position about the X-axis, there is an adjusting screw 83 which is adjustably mounted on the interferometer head and whose tip 83a, of a spherically rounded configuration, also bears against the flat surface of the base portion 77. For adjustment of the rotational position about the Z-axis, there is an eccentric 85 which is fitted into a slot 84 and which has a cylindrical outside surface and an eccentrically arranged bore 86 for receiving a fixing screw 87 which can be screwed into a screwthread 88 in the base portion 77. When a fixing screw 87 is screwed into the screwthread 88, the rotational position of the interferometer head about the Z-axis can be established by turning the eccentric 85.

The embodiment shown in FIG. 8 illustrates extension of the above-described embodiments to an interferometer arrangement comprising three identical interferometer heads 1, 1' and 1" (for example such as those shown in FIGS. 2 and 3). When the interferometer heads are arranged in a suitable fashion, it is possible for example to provide a three-axis system with which it is possible to detect the position of a component in space. In comparison with the previously illustrated embodiments, the embodiment illustrated in FIG. 8, apart from three times the number of interferometer heads, differs in that the light from the laser diode 2 is firstly supplied to a light distributor 90 which includes two beam splitters 91 and 92 in order uniformly to distribute the light at its input 93 to the three output s 94. The input 93 of the light distributor 90 is connected to the fiber 38 coming from the laser diode 2 by way of a glass fiber 95, the optical length of which is preferably at least one meter, the glass fiber 95 being connected at both ends by releasable fiber connections. The interferometer heads 1, 1', 1" are connected to the outputs 94 of the light distributor 90 by way of releasable fiber connectors 37'. At the interferometer head end, there are two-part releasable fiber couplings 70a, 70b; 70a', 70b'; 70a", 70b". The four plastic optical fibers 33a–d which lead out of each interferometer head and which transmit the optical interference signals are connected in the first interferometer head 1 to the detector or evaluation device 3 disposed in the housing 27 while the detector or evaluation devices 3', 3" for the other two interferometer heads 1', 1" are disposed in separate housings 27' and 27". At the interferometer head end, there are two-part releasable fiber couplings 71a, 71b; 71a', 71b'; 71a", 71b".

The standard 41 which is connected to the housing 27 by way of the monomode glass fiber 53 and the electric line 52 is arranged in practice in the vicinity of the measuring section in order to ensure that the same ambient conditions obtain between the mirror surfaces of the standard, as on the measuring section.

It will be appreciated that the invention is not restricted to the illustrated embodiments. For example, in place of the laser diode, it is also possible to use any other suitable laser light source, in particular a helium neon laser which emits in the visible range. If the laser light source emits at a given fixed frequency, there is the possibility of compensating for the ambient conditions (refractive index of the air on the measuring section) by computation in order to ascertain the displacement travel or distance in metric units. In principle it is also possible for the support body of the interferometer head to comprise only a flat plate, although a substantially closed housing appears more advantageous. Instead of individual lenses for coupling the measuring beam in and out, it is also possible to use in each case lens assemblies which consist of a plurality of lenses and which are then all fixedly connected to the support body of the housing of the interferometer head (possibly after preceding adjustment). Apart from the beam splitter 7, further beam splitters may also be provided in the interferometer head, in the measuring and reference beam paths. Besides the configuration shown in FIG. 6, in which the reference beam is divided into two portions by a beam splitter, it is also possible for example for one or more further beam splitters to be arranged downstream of the beam splitter 7 in the measuring beam path portion in the interferometer head in order to branch off additional reference beam portions. Further configurations which are not explicitly referred to here are also certainly conceivable and possible within the scope of protection defined by the patent claims.

We claim:

1. An interferometer head comprising a support body to which there are rigidly connected a beam splitter for spatially dividing laser light into a measuring beam and a reference beam and at least one recombination device at which a respective reference beam which is guided by way of a reference section extending in the interferometer head and a respective measuring beam or measuring beam component which is guided by way of a movable measuring mirror of a reflecting measuring surface interfere, forming at least one optical interference signal, characterized in that the interferometer head has a coupling-out lens which is connected to the support body of the interferometer head, for coupling-out of the measuring beam guided in the interferometer head in at least one light waveguide on to a measuring section which is disposed outside the interferometer head, that the interferometer head further has at least one coupling-in lens connected to the support body for coupling-in of the measuring beam or measuring beam component which is returning from the measuring section after reflection at a measuring mirror arranged outside the interferometer head or at a reflecting surface, into a respective light waveguide, and that light waveguides are provided for guidance of a reference beam or beams and the parts of the measuring beam which extend in the interferometer head, which light waveguides are rigidly connected to the support body of the interferometer head.

2. An interferometer head according to claim 1 characterized in that a continuous light waveguide or a plurality of successively disposed overall continuous light waveguides leads or lead from the beam splitter which is in the form of a waveguide coupler to a focal point region of the coupling-out lens, and that a continuous light waveguide or a plurality of successively disposed overall continuous light waveguides leads or lead from the focal point region of each coupling-in lens to a respective recombination device which is in the form of a waveguide coupler.

3. An interferometer according to claim 1 characterized in that one or more light waveguides which is or are preferably rigidly connected to the support body is or are provided for guiding the laser light from an input of the interferometer head to the beam splitter, at least in a portion-wise manner, and that one or more light waveguides which is or are preferably rigidly connected to the support body is or are provided for guiding the optical interference signal or signals, after the recombination device or devices, to at least one output of the interferometer head, at least in a portion-wise manner.

4. An interferometer head according to claim 1 characterized in that the light waveguides in the interferometer head are optical fibers.

5. An interferometer according to claim 4 characterized in that at least a part of the optical fibers is laid in the interferometer head at least in a portion-wise manner in the form of loops or turns or coils.

6. An interferometer head according to claim 1 characterized in that the light waveguides in the interferometer head are at least in part in the form of waveguide tracks which are diffused into a carrier substrate, and the beam splitter and at least one of the recombination devices preferably being integrated on the same carrier substrate.

7. An interferometer head according to claim 6 characterized in that the carrier substrate is glued fast to the support body of the interferometer head.

8. An interferometer head according to claim 1 characterized in that the light waveguides in the interferometer head are arranged substantially in one plane, preferably on a flat support.

9. An interferometer head according to claim 1 characterized in that the light waveguides in the interferometer head are single-mode waveguides, for example monomode glass fibers.

10. An interferometer head according to claim 1 characterized in that all light waveguides in the interferometer head and all optical components in the interferometer head are rigidly connected to the support body.

11. An interferometer head according to claim 1 characterized in that the optical fibers in the interferometer head are glued fast at least in a portion-wise manner and preferably substantially over their entire length to the support body or a portion fixed thereto.

12. An interferometer head according to claim 1 characterized in that at least the optical fibers which carry the measuring beam and the reference beam or beams are cast with a hardening material.

13. An interferometer head according to claim 12 characterized in that the hardened material adheres firmly to the support body.

14. An interferometer head according to claim 12 characterized in that the hardening material is a resin which is thermosetting in a hardened condition.

15. An interferometer head according to claim 12 characterized in that the hardening material is an epoxy resin.

16. An interferometer head according to claim 12 characterized in that all optical components of the interferometer head with light waveguides, preferably together with the coupling-in and coupling-out lenses or the holders thereof and the support body are cast together.

17. An interferometer head according to claim 1 characterized in that the reference beam or beams is or are each guided throughout in a light waveguide in the interferometer head.

18. An interferometer head according to claim 17 characterized in that the path followed by each of the reference beams in the light waveguides between the beam splitter and the recombination device is of substantially the same length as the sum of those paths covered by the measuring beam in the interferometer head in light waveguides.

19. An interferometer head according to claim 1 characterized in that the support body is surrounded by a housing fixedly connected thereto or itself forms a housing.

20. An interferometer head according to claim 19 characterized in that the housing is of a trough-like configuration, wherein at least a large part of the optical components of the interferometer head together with light waveguides are arranged in a region of the housing trough, preferably in a region of a trough bottom which is of a flat configuration.

21. An interferometer head according to claim 19 characterized in that the housing is closed on all sides or can be closed by a releasably fixed cover or the like.

22. An interferometer head according to claim 19 characterized in that the support body and/or the housing comprise metal.

23. An interferometer head according to claim 12 characterized in that the housing is at least partially filled with the hardening material, possibly after adjustment of adjustable components.

24. An interferometer head according to claim 9 characterized in that the housing is at least partially filled with the hardening material, possibly after adjustment of adjustable components.

25. An interferometer head according to claim 19 characterized in that the coupling-in and coupling-out lenses are arranged in the region of the housing wall.

26. An interferometer head according to claim 1 characterized in that the coupling-in and coupling-out lenses are rigidly connected to the support body.

27. An interferometer head according to claim 1 characterized in that the coupling-in and coupling-out lenses are adjustably mounted on the support body, preferably by way of adjustable lens holders, and can be arrested in a set position, preferably by way of fixing means.

28. An interferometer head according to claim 1 characterized in that the interferometer head when ready for operation has a coupling-out lens and a coupling-in lens which is oriented in parallel relationship therewith.

29. An interferometer head according to claim 1 characterized in that it is connected to a flexible optical fiber for the feed of laser light or has a releasable fiber connector for connection to such an optical fiber.

30. An interferometer head according to claim 1 characterized in that it is connected to at least one flexible optical fiber for transmission of one or more optical interference signals from the interferometer head to a photoelectric detector device, or has at least one releasable fiber connector for the connection of such optical fibers.

31. An interferometer head according to claim 1 characterized in that the fiber connector or connectors for a releasable connection of one or more flexible optical fibers to the interferometer head is or are each in the form of a respective two-part fiber coupling, wherein the part towards the interferometer of each fiber coupling is connected to one or more light waveguides in the interferometer head and is connected to or is provided on the support body or the housing of the interferometer head, and wherein the other part of each fiber coupling, which corresponds to the part towards the interferometer head, is connected to one or more flexible optical fibers.

32. An interferometer head according to claim 1 characterized in that the interferometer head or its support body is mounted adjustably on a base portion.

33. An interferometer head according to claim 1 characterized in that it has adjustable adjusting elements for fixing the spatial position of the support body relative to a base portion.

34. An interferometer head according to claim 33 characterized in that the support body can be connected to the base portion by way of a ball joint-like connection and the adjusting elements includes screws mounted displaceably on the interferometer head, which each bear with their preferably rounded tip against a surface of the base portion.

35. An interferometer head according to claim 32 characterized in that the support body is displaceable relative to the base portion by way of an eccentric.

36. An interferometer arrangement comprising an interferometer head according to claim 1, a laser light source which is arranged outside the interferometer head and whose laser light is fed to the interferometer head, a photoelectric detector device arranged outside the interferometer had for detecting and evaluating at least one optical interference signal from the interferometer head, and, arranged outside the interferometer head, a movable measuring mirror or a reflecting measuring surface for reflecting the measuring beam issuing from the interferometer head back to the interferometer head.

37. An interferometer arrangement according to claim 36 characterized in that at least one respective flexible optical fiber is provided for the feed of laser light from the laser light source to the interferometer head and/or for transmission of a opitcal interference signals from the signals from the interferometer head to the photoelectric detector device.

38. An interferometer arrangement according to claim 37 characterized in that a respective releasable, preferably two-part fiber connector is provided for the flexible optical fibers at the end towards the interferometer head and at the opposite end.

39. An interferometer arrangement according to claim 37 characterized in that the flexible optical fiber for the laser light feed is a monomode glass fiber.

40. An interferometer arrangement according to claim 38 characterized in that a flexible optical fiber for the laser light feed is s polarization-maintaining optical fiber.

41. An interferometer arrangement according to claim 37 characterized in that the flexible optical fiber or fibers for transmission of the optical interference signals from the interferometer head to a photoelectric detector device is or are a multimode optical fiber or fibers.

42. An interferometer arrangement according to claim 36 characterized in that it has a plurality of preferably similar interferometer heads.

43. An interferometer arrangement according to claim 42 characterized in that all interferometer heads are supplied with laser light from a common laser light source, preferably by way of flexible optical fibers.

44. An interferometer arrangement according to claim 42 characterized in that all interferometer heads are connected by way of flexible optical fibers to a respective photoelectric detector device or jointly to a central photoelectric detector device.

45. An interferometer arrangement according to claim 42 characterized in that associated with each interferometer head is its own movable measuring mirror, preferably a retroreflector.

46. An interferometer arrangement according to claim 36 characterized in that it has a means for detecting and/or following the refractive index or light wavelength on the measuring section in the gaseous ambient medium.

* * * * *